United States Patent
Amaral et al.

(10) Patent No.: US 6,915,649 B2
(45) Date of Patent: Jul. 12, 2005

(54) OPTIMIZED HEAT PUMP APPARATUS FOR REGULATING MOTOR VEHICLE TEMPERATURE

(75) Inventors: Manuel Amaral, Vitry-sur-Seine (FR); Emmanuel Coutaux, La Garenne Colombes (FR); Thomas Gielda, Brighton, MI (US); Franck Vouzelaud, Paris (FR)

(73) Assignees: Peugeot Citroen Autombiles SA, Neuilly-sur-Seine (FR); Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/275,876

(22) PCT Filed: May 14, 2001

(86) PCT No.: PCT/FR01/01458

§ 371 (c)(1),
(2), (4) Date: Jan. 15, 2003

(87) PCT Pub. No.: WO01/87651

PCT Pub. Date: Nov. 22, 2001

(65) Prior Publication Data

US 2004/0089014 A1 May 13, 2004

(30) Foreign Application Priority Data

May 15, 2000 (FR) .............................................. 00 06116
Apr. 3, 2001 (FR) .............................................. 01 04532

(51) Int. Cl.$^7$ ................................................ B60H 1/32
(52) U.S. Cl. .............................. 62/244; 62/434; 62/435
(58) Field of Search ........................... 62/244, 434, 435, 62/506, 181, 183, 185

(56) References Cited

U.S. PATENT DOCUMENTS

| | | | |
|---|---|---|---|
| 2,893,218 A | | 7/1959 | Harnish |
| 4,761,967 A | * | 8/1988 | Sumikawa et al. ........... 62/201 |
| 5,138,851 A | * | 8/1992 | Mardikian .................... 62/244 |
| 5,265,437 A | | 11/1993 | Saperstein et al. |
| 5,421,169 A | | 6/1995 | Benedict |
| 5,784,893 A | * | 7/1998 | Furuhama et al. ............. 62/333 |
| 5,878,589 A | * | 3/1999 | Tanaka et al. ................ 62/199 |
| 5,904,052 A | * | 5/1999 | Inoue et al. .................. 62/244 |
| 6,038,877 A | * | 3/2000 | Peiffer et al. ................. 62/244 |
| 6,112,543 A | * | 9/2000 | Feuerecker et al. ........... 62/430 |
| 6,260,376 B1 | * | 7/2001 | Khelifa et al. ................ 62/435 |
| 6,276,161 B1 | * | 8/2001 | Peiffer et al. ................. 62/406 |
| 6,394,210 B2 | * | 5/2002 | Matsuda et al. ........... 180/68.1 |

FOREIGN PATENT DOCUMENTS

| | | |
|---|---|---|
| DE | 199 30 148 A1 | 1/2000 |
| EP | 0 999 078 A1 | 5/2000 |
| FR | 2 697 210 | 4/1994 |
| JP | 09169207 A * | 12/1995 |
| JP | 10338023a * | 12/1998 |
| JP | 2000025448 A * | 1/2000 |

* cited by examiner

*Primary Examiner*—William E. Tapolcai
*Assistant Examiner*—Mohammad M. Ali
(74) *Attorney, Agent, or Firm*—Oliff & Berridge, PLC

(57) ABSTRACT

This temperature regulation apparatus comprises a heat pump (12) comprising a main compression circuit (14) for a refrigerant fluid taking heat from a cold source (16) and transferring it to a hot source (18). The cold source (16) comprises a first heat exchanger (24) for exchanging heat between the refrigerant fluid and a liquid coolant thermally coupling the main refrigerant circuit (14) to a first secondary coolant circuit (26). The first secondary circuit (26) has selective connection means (40, 52, 54) for selectively connecting it to the upstream and downstream ends (48A, 48B) of a "heater" branch (48) of a cooling liquid circuit (46) of an exothermal part of the vehicle. The exothermal part is preferably a heat engine of the vehicle. The invention is applicable to air conditioning a motor vehicle cabin.

17 Claims, 4 Drawing Sheets

OPTIMIZED HEAT PUMP APPARATUS FOR REGULATING MOTOR VEHICLE TEMPERATURE

The present invention relates to an optimised motor vehicle temperature regulation apparatus with a heat pump.

It applies in particular to air conditioning a motor vehicle cabin and/or to regulating the temperature of a part of said vehicle.

The state of the art, and in particular FR-2 697 210, discloses motor vehicle temperature regulation apparatus of the type comprising:

- a first heat pump (12) comprising a main compression circuit (14) for refrigerant fluid taking heat from a cold source (16) to transfer it to a hot source (18);
- the cold source (16) comprising a first heat exchanger (24) for exchanging heat between the refrigerant fluid and a coolant liquid, thereby thermally coupling the main refrigerant circuit (14) to a first secondary coolant circuit (26).

As a general rule, the compression circuit comprises an evaporator in heat exchange with the cold source, and a condenser in heat exchange with the hot source, these elements being connected together by a compressor and an expander. The refrigerant vaporizes in the evaporator, thereby taking heat from the cold source. The compressor draws in the vaporized refrigerant and delivers it into the compressor which is cooled by heat exchange with the hot source and in which the refrigerant condenses. The condenser allows the refrigerant in the liquid state to pass to the evaporator while lowering its pressure.

A heat pump can be used either to heat a space or a part or else to cool said space or said part.

In FR-2 697 210, the hot source comprises a second refrigerant/coolant heat exchanger thermally coupling the main refrigerant circuit to a second secondary coolant circuit. The secondary circuits are capable of being selectively connected via appropriate valves to an outside heat exchanger placed in the engine compartment of the vehicle, and to an inside heat exchanger placed in the vehicle cabin. By acting on the valves, it is possible to use the heat exchanger either to cool the vehicle cabin (in which case the hot source is the outside heat exchanger and the cold source is the inside heat exchanger), or else to heat the cabin (in which case the hot source is the inside heat exchanger and the cold source is the outside heat exchanger).

It should be observed that in the second case the performance of the heat pump is limited by the temperature of the outside air. In the cold season, air temperature is not sufficient to obtain satisfactory efficiency for the heat pump when it is used for the purpose of heating the cabin. Furthermore, frosting of the cold source in the cold season can degrade the performance of the heat pump in operation.

Furthermore, the reversibility of the outside and inside heat exchangers (each of which is used either as a hot source or as a cold source) leads essentially to the following two drawbacks:

1) the performance of each heat exchanger is limited by the fact that it cannot be optimized for specific operation of the heat exchanger either as a hot source or else as a cold source; and 2) it is difficult to control the humidity of the air surrounding the inside heat exchanger.

The second drawback is particularly troublesome when air conditioning the vehicle cabin in mid-season. Under such circumstances, the inside heat exchanger is likely to be subjected to frequent changeovers in its mode of operation between refrigerating and heating the cabin. Thus, in refrigerating mode, the inside heat exchanger picks up water. On switching to heating mode, the water accumulated while refrigerating is exhausted into the cabin by evaporation. FR-2 697 210 proposes mitigating that drawback by means of an auxiliary heat exchanger placed close to the inside heat exchanger. Nevertheless, that auxiliary heat exchanger is not functional under certain circumstances, in particular for mid-season temperatures of around 15° C.

An object of the invention is to optimize the performance of heat pump temperature regulation apparatus, in particular when it is used for heating or refrigerating the cabin of a motor vehicle, or indeed when it is used for regulating the temperature of a part of said vehicle.

For this purpose, the invention provides motor vehicle temperature regulation apparatus of the above-specified type, characterized in that the first secondary circuit includes first selective connection means for selectively connecting it to the upstream and downstream ends of a "heater" branch of a cooling liquid circuit for an exothermal part of the vehicle.

According to characteristics of various embodiments of the apparatus:

- the first selective connection means comprise first upstream connection means for connection to the upstream end of the heater branch, and first downstream connection means for connection to the downstream end of said heater branch;
- the first secondary circuit is capable of being selectively connected to a "cold" heat exchanger by the first selective connection means;
- the cold heat exchanger is a coolant/air heat exchanger;
- the first upstream selective connection means comprise a "heater branch" valve provided with at least three ports, a first port being connected to the outlet of the first refrigerant/coolant heat exchanger, a second port being connected to the upstream end of the heater branch, and a third port being connected to the inlet of the cold heat exchanger;
- the first secondary circuit is capable of being selectively connected to an "outside" heat exchanger via the first selective connection means;
- the first upstream selective connection means comprise an "outside heat exchanger" valve of the three-port type having a first port connected to the outlet of the first refrigerant/coolant heat exchanger, a second port connected to the inlet of the outside heat exchanger, and a third port connected to the first port of the heater branch valve;
- the heater branch valve has a fourth port connected to the inlet of the outside heat exchanger;
- the outside heat exchanger is a coolant/air heat exchanger;
- the hot source comprises a second refrigerant/coolant heat exchanger thermally coupling the main refrigerant circuit to a second secondary coolant circuit having second selective connection means for connection to a "hot" heat exchanger;
- the second secondary circuit is capable of being selectively connected to the outside heat exchanger via the second selective connection means;
- the downstream end of the heater branch is capable of being selectively connected to the inlet of the hot heat exchanger via the first downstream selective connection means;
- the first downstream selective connection means comprise a three-port type valve having a first port connected to the downstream end of the heater branch, a second port connected to the inlet of the first refrigerant/coolant heat exchanger, and a third branch connected to the inlet of the hot heat exchanger;

the apparatus comprises third selective connection means for connecting the outlet of the hot heat exchanger to the second secondary coolant circuit and to the heater branch;

the third selective connection means comprise a three-port type valve having a first port connected to the outlet of the hot heat exchanger, a second port connected to the inlet of the second heat exchanger, and a third port connected to the downstream end of the heater branch;

the hot heat exchanger is a coolant/air heat exchanger;

the coolant liquid of the second secondary circuit is a mixture of water and antifreeze;

the coolant liquid of the first secondary circuit is a mixture of water and antifreeze; and the exothermal part is a heat engine of the vehicle.

The invention will be better understood on reading the following description given purely by way of example and made with reference to the accompanying drawings, in which:

FIG. 1 shows motor vehicle temperature regulation apparatus constituting a first embodiment of the invention, and given overall reference 10.

Figure 1:
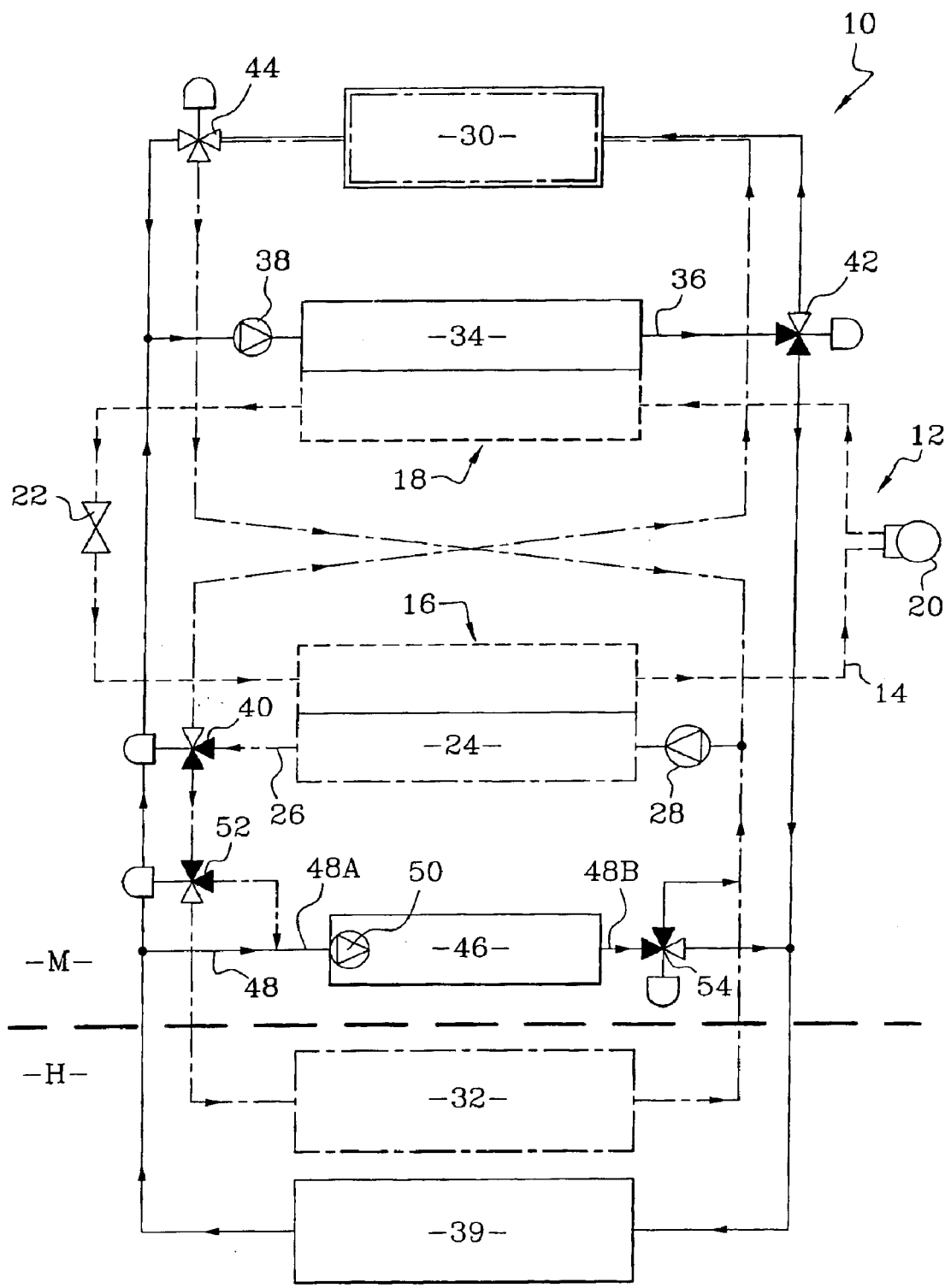
FIG. 1 is a diagrammatic view of motor vehicle temperature regulation apparatus constituting a first embodiment of the invention.

In the description below, two parts are said to be thermally coupled together when they exchange heat between each other by means of a suitable heat exchanger.

The temperature regulation apparatus 10 comprises a heat pump 12 having a main refrigerant circuit 14 of the compression type taking heat from a cold source 16 and transferring at least some of it to a hot source 18.

The cold and hot sources 16 and 18 are connected together by a compressor 20 (electrically or mechanically driven) and an expander valve 22. The refrigerant vaporizes taking heat from the cold source 16. The compressor 20 draws in the vaporized refrigerant and delivers it to the hot source where it condenses and cools. The expander valve 22 allows the refrigerant to pass in liquid form towards the cold source 16 by lowering its pressure. The refrigerant circulates around the circuit 14 in the direction marked by arrows in FIG. 1.

The cold source 16 comprises a first refrigerant/coolant heat exchanger 24 thermally coupling the main refrigerant circuit 14 to a first secondary circuit 26 for liquid coolant. This circuit includes a pump 28 for circulating the liquid coolant, which pump is connected to the inlet of the first heat exchanger 24.

The first secondary circuit 26 is capable of being selectively connected to an "outside" heat exchanger 30 and to a "cold" heat exchanger 32.

In the example shown in FIG. 1, the outside heat exchanger 30 is a coolant/air heat exchanger placed in the engine compartment M of the vehicle, and the cold heat exchanger 32 is a coolant/air heat exchanger placed in the vehicle cabin H.

The hot source 18 has a second refrigerant/coolant heat exchanger 34 thermally coupling the main refrigerant circuit 14 to a second secondary circuit 36 for liquid coolant. This second secondary circuit comprises a pump 38 for circulating the liquid coolant, which pump is connected to the inlet of the second heat exchanger 34.

The second secondary circuit 36 is capable of being selectively connected to the outside heat exchanger 30 and to a "hot" heat exchanger 39.

In the example shown in FIG. 1, the hot heat exchanger 39 is a coolant/air heat exchanger placed in the vehicle cabin H.

A conventional fan (not shown in the figures) serves to cause a flow of air to circulate through the cold and hot heat exchangers 32 and 39.

The heat pump 12 connected to the first and second heat exchangers 24 and 34 is located, for example, in the engine compartment of the vehicle.

The refrigerant circulating in the main circuit 14 is of a conventional type. By way of example, this refrigerant is selected from chlorine or fluorine derivatives of methane or of ethane (Freon), hydrocarbons, ammonia, or carbon dioxide. The coolant liquid circulating in the first and second secondary circuits 26 and 36 is preferably a mixture of water and antifreeze (glycol).

The two secondary coolant circuits 26 and 36 are connected respectively to the outside, cold, and hot heat exchangers 30, 32, and 39 by means of three-port type valves, specifically a valve 40 of the first secondary circuit referred to as an outside heat exchanger valve, a valve 42 of the second secondary circuit, and a valve 44 that is common to both secondary circuits.

FIG. 1 also shows a cooling liquid circuit 46 of an exothermal part of the vehicle, which circuit has a branch 48 referred to as the "heater" branch. The heater branch 48 is provided with a conventional pump 50. In the example shown, the exothermal part is a motor for the vehicle. This motor serves to propel the vehicle and is preferably of the heat engine type. Nevertheless, in a variant, the motor could be of some other type, and in particular it could be an electric motor.

The cooling liquid circulating in the heater branch 48 is preferably a mixture of water and antifreeze (glycol) like the coolant circulating in the secondary circuits 26 and 36.

The first secondary circuit 26 is capable of being selectively connected to the upstream and downstream ends 48A and 48B of the heater branch 48. For this purpose, the first secondary circuit 26 comprises:

upstream means for selective connection to the upstream end 48A of the heater branch and comprising the outside heat exchanger valve 40 together with a three-port type valve 52 referred to as the "heater branch" valve; and downstream means for selective connection to the downstream end 48B of the heater branch and comprising a three-port type valve 54.

The outside heat exchanger valve 40 is provided with a first port connected to the outlet of the first refrigerant/coolant heat exchanger 24, a second port connected to the inlet of the outside heat exchanger 30, and a third port connected to the heater branch valve 52.

The valve 42 of the second secondary circuit 36 has a first port connected to the outlet of the second refrigerant/coolant heat exchanger 34 of the hot source, a second port connected to the inlet of the outside heat exchanger 30, and a third port connected to the inlet of the hot heat exchanger 39.

The valve 44 common to the first and second secondary coolant circuits 26 and 36 is provided with a first port connected to the inlet of the first refrigerant/coolant heat exchanger 24 of the cold source, a second port connected to the inlet of the second refrigerant/coolant heat exchanger 34 of the hot source, and a third port connected to the outlet of the outside heat exchanger 30.

The heater branch valve 52 is provided with a first port connected indirectly to the outlet of the first refrigerant/coolant heat exchanger 24 via the third port of the outside heat exchanger valve 40, a second port connected to the upstream end 48A of the heater branch, and a third port connected to the inlet of the cold heat exchanger 32.

The valve 54 is provided with a first port connected to the downstream end 48B of the heater branch, a second port connected to the inlet of the first refrigerant/coolant heat exchanger 24, and a third port connected to the inlet of the hot heat exchanger 39. The valve 54 thus enables the downstream end 48B of the heater branch to be selectively connected to the inlet of the hot heat exchanger 39.

The valves 40 to 44, 52, and 54 are controlled by conventional electrical, mechanical, thermomechanical, or pneumatic means.

FIG. 1 shows the apparatus 10 in a configuration for heating the cabin. In this case, the valve 42 is set so as to connect the second secondary coolant circuit 36 to the hot heat exchanger 39. In an initial state of operation, the valves, 40, 52, and 54 are set to connect the first secondary coolant circuit 26 to the heater branch 48.

The coolant of the first secondary circuit 26 takes heat from the heater branch 48 and delivers it to the vaporized refrigerant via the first refrigerant/coolant heat exchanger 24.

The coolant of the second cooling circuit 36 takes heat from the condensed refrigerant via the second refrigerant/coolant heat exchanger 34 and delivers it to the cabin via the hot heat exchanger 39.

By way of example, the exothermal part cooled by the liquid circulating in the heater branch 48 is assumed to be a two liter direct injection diesel engine. It is also assumed that the temperature of the engine is initially the same as the temperature outside the vehicle, i.e. −18° C. About two minutes after starting, the diesel engine delivers power of 1.25 kilowatts (kW) to the heater branch 48 and the temperature of the cooling liquid in this heater branch 48 reaches about 0° C. Since the coefficient of performance of the heat pump 12 is about 3, the power recovered by the hot source 18 is about 4.5 kW, with the temperature of the coolant condensing in the hot source 18 reaching about 30° C. The power from the hot source 18 is transferred to the cabin H by a hot heat exchanger 39.

In a second stage of operation of the apparatus 10, in particular when the engine cooling liquid reaches a sufficiently high temperature, e.g. about 83° C., the heat pump 12 is stopped (stopping the compressor 20 and the pumps 28 and 38) and then the valve 54 is set so as to connect the downstream end 48B of the heater branch to inlet of the hot heat exchanger 39. The heat delivered to the cabin H then comes from the heater branch 48 via the hot heat exchanger 39 connected to said branch 48.

It should be observed that the valves can be set in other configurations that are suitable for heating the cabin H. In particular, the settings of the valves 40 and 44 may be different from that shown in FIG. 1 so as to connect the first secondary coolant circuit 26 to the outside heat exchanger 30. This configuration is appropriate when the temperature outside the vehicle is not too low.

In order to configure the temperature regulation apparatus 10 in vehicle cabin refrigerating mode, the valves 40 to 44 are set so as to connect the first secondary coolant circuit 26 to the cold heat exchanger and the second secondary coolant circuit 36 to the outside heat exchanger 30.

Under such circumstances, the coolant of the first secondary circuit 26 takes heat from inside the cabin via the cold heat exchanger 32 and delivers it to the vaporized refrigerant via the first refrigerant/coolant heat exchanger 24. Furthermore, the coolant of the second secondary circuit 36 takes heat from the condensed refrigerant via the second refrigerant/coolant heat exchanger 34 and delivers it to outside the vehicle via the outside heat exchanger 30.

Figure 2:
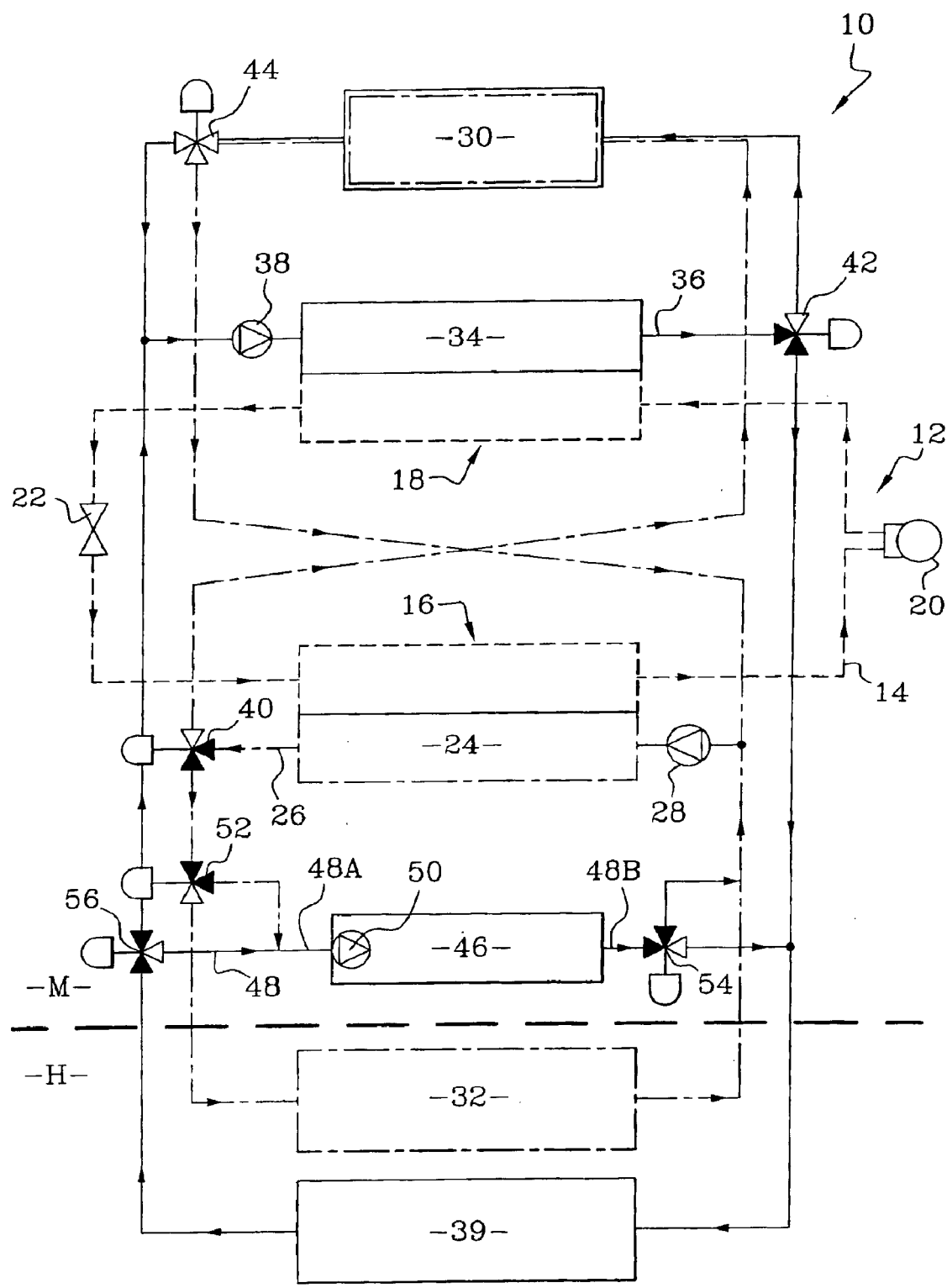
FIGS. 2 to 4 are diagrammatic fragmentary views analogous to FIG. 1 showing motor vehicle temperature regulation apparatuses constituting second to fourth embodiments of the invention, respectively.
Figure 3:
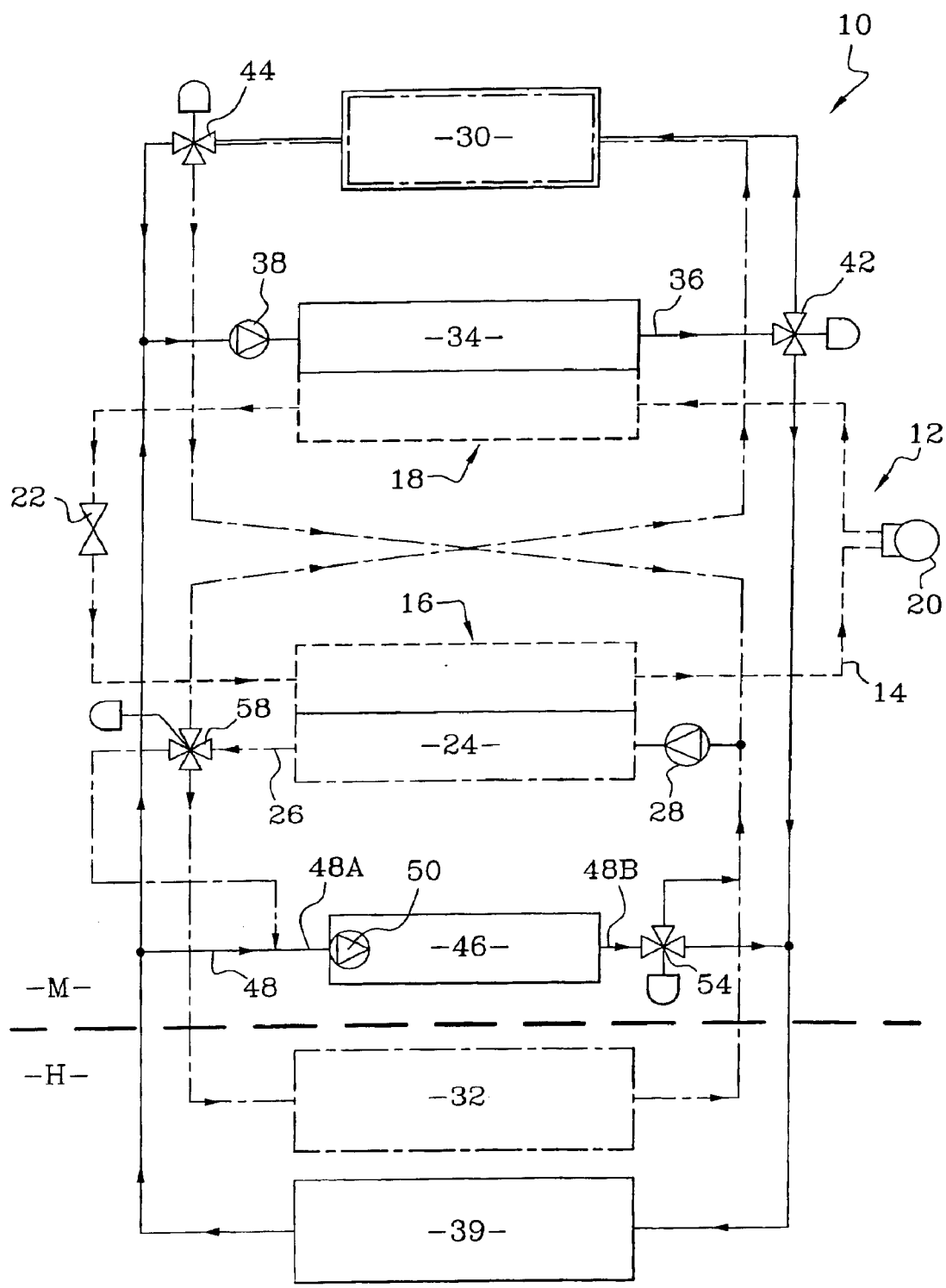
Figure 4:
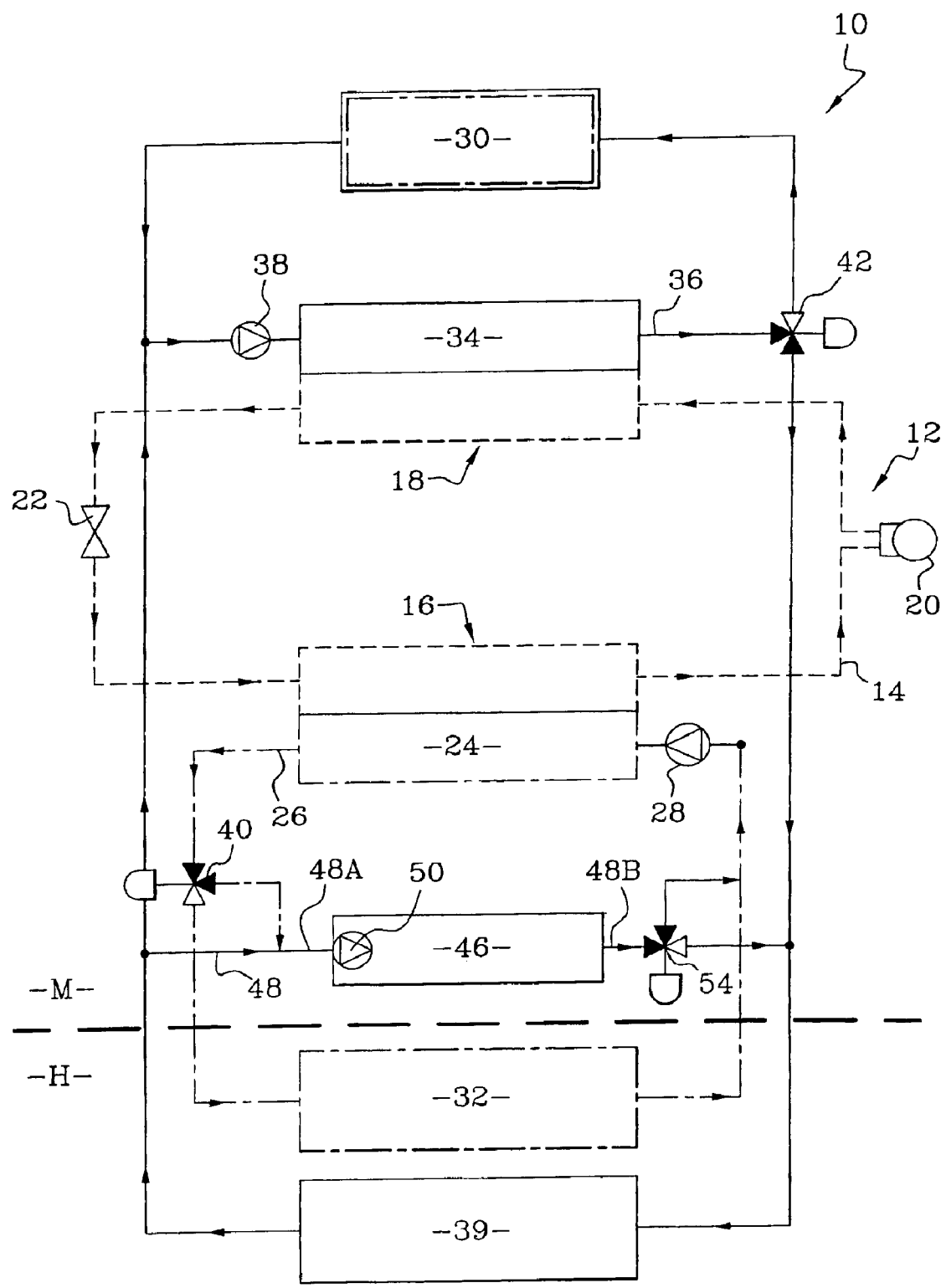

FIGS. 2 to 4 show the temperature regulation apparatus 10 in second, third, and fourth embodiments of the invention. In FIGS. 2 to 4, elements analogous to those of the preceding figure are designated by identical references.

In the second embodiment of the invention shown in FIG. 2, a three-port type valve 56 enables the outlet of the hot heat exchanger 39 to be selectively connected to the second secondary coolant circuit 36 and to the heater branch 48. This valve 56 is provided with a first port connected to the outlet of the hot heat exchanger 39, a second port connected to the inlet of the second heat exchanger 34, and a third port connected to the upstream end 48A of the heater branch.

The valve 56 increases the number of possible operating configurations for the apparatus 10.

In the third embodiment of the invention shown in FIG. 3, a four-port valve 58 of the heater branch replaces the outside heat exchanger valve 40 and the heater branch valve 52 of the first embodiment of the invention. The valve 58 has three ports analogous to those of the valve 52 (including one port connected directly to the outlet of the first refrigerant/coolant heat exchanger 24), together with a fourth port connected to the inlet of the outside heat exchanger 30.

The valves 56 and 58 are controlled by conventional electrical, mechanical, thermomechanical, or pneumatic means.

The fourth embodiment of the invention shown in FIG. 4 differs from that shown in FIG. 1 in that the valves 44 and 52 are omitted. In this simplified embodiment, the cold source 16 cannot be connected to the outside heat exchanger 30. The fourth embodiment of the invention is adapted to circumstances where the energy supplied by the heater branch 48 is sufficient to obtain effective operation of the heat pump 12 in cabin-heating mode.

Naturally, the various embodiments of the invention described above can be combined with one another.

Among the advantages of the invention, it should be observed that coupling the cold source thermally with the heater branch of the vehicle optimizes the efficiency of the temperature regulation apparatus when it is in use for heating the vehicle cabin, and serves to provide a temperature rise in the cabin that is particularly fast.

What is claimed is:

1. Motor vehicle temperature regulation apparatus comprising:

a first heat pump comprising a main compression circuit for refrigerant fluid taking heat from a cold source to transfer it to a hot source;

the cold source comprising a first heat exchanger for exchanging heat between the refrigerant fluid and a coolant liquid, thereby thermally coupling the main refrigerant circuit to a first secondary coolant circuit;

the hot source comprising a second heat exchanger thermally coupling the main refrigerant circuit to a second secondary coolant circuit, wherein the first secondary circuit includes first selective connection means for selectively connecting the first secondary circuit to the upstream and downstream ends of a branch of a coolant liquid circuit, wherein the branch is used to cool a heat engine of the vehicle, the branch being designated as a heater branch, the second secondary circuit including second selective connection means for connection to a "hot" heat exchanger, and the first selective connection means comprise a valve means comprising:

a first port connected to the downstream end of the heater branch;

a second port connected to an inlet of the first heat exchanger; and a third port connected to an inlet of the hot heat exchanger.

2. Apparatus according to claim 1, characterized in that the first selective connection means comprise first upstream connection means for connection to the upstream end of the heater branch, and first downstream connection means for connection to the downstream end of said heater branch.

3. Apparatus according to claim 1, characterized in that the first secondary circuit is capable of being selectively connected to a "cold" heat exchanger by the first selective connection means.

4. Apparatus according to claim 3, characterized in that the cold heat exchanger is a coolant/air heat exchanger.

5. Apparatus according to claim 3, characterized in that the first selective connection means comprise first upstream connection means for connection to the upstream end of the heater branch, and in that the first upstream selective connection means comprise a "heater branch" valve provided with at least three ports, a first port being connected to the outlet of the first refrigerant/coolant heat exchanger, a second port being connected to the upstream end of the heater branch, and a third port being connected to the inlet of the cold heat exchanger.

6. Apparatus according to claim 1, characterized in that the first secondary circuit is capable of being selectively connected to an "outside" heat exchanger via the first selective connection means.

7. Apparatus according to claim 5, characterized in that the first selective connection means comprise first upstream connection means for connection to the upstream end of the heater branch, and first upstream selective connection means comprise a "heater branch" valve provided with at least three ports, a first port being connected to the outlet of the first refrigerant/coolant heat exchanger, a second port being connected to the upstream end of the heater branch, and a third port being connected to the inlet of the cold heat exchanger, and in that the first upstream selective connection means comprise an "outside heat exchanger" valve of the three-port type having a first port connected to the outlet of the first refrigerant/coolant heat exchanger, a second port connected to the inlet of the outside heat exchanger, and a third port connected to the first port of the heater branch valve.

8. Apparatus according to claim 6, characterized in that the first selective connection means comprise first upstream connection means for connection to the upstream end of the heater branch, and first upstream selective connection means comprise a "heater branch" valve provided with at least three ports, a first port being connected to the outlet of the first refrigerant/coolant heat exchanger, a second port being connected to the upstream end of the heater branch, and a third port being connected to the inlet of the cold heat exchanger, and in that the heater branch valve has a fourth port connected to the inlet of the outside heat exchanger.

9. Apparatus according to claim 6, characterized in that the outside heat exchanger is a coolant/air heat exchanger.

10. Apparatus according to claim 6, characterized in that the second secondary circuit is capable of being selectively connected to the outside heat exchanger via the second selective connection means.

11. Apparatus according to claim 2, characterized in that the downstream end of the heater branch is capable of being selectively connected to the inlet of the hot heat exchanger via the first downstream selective connection means.

12. Apparatus according to claim 11, characterized in that the first downstream selective connection means comprise a three-port type valve having a first port connected to the downstream end of the heater branch, a second port connected to the inlet of the first refrigerant/coolant heat exchanger, and a third branch connected to the inlet of the hot heat exchanger.

13. Apparatus according to claim 1, characterized in that it comprises third selective connection means for connecting the outlet of the hot heat exchanger to the second secondary coolant circuit and to the heater branch.

14. Apparatus according to claim 13, characterized in that the third selective connection means comprise a three-port type valve having a first port connected to the outlet of the hot heat exchanger, a second port connected to the inlet of the second heat exchanger, and a third port connected to the downstream end of the heater branch.

15. Apparatus according to claim 1, characterized in that the hot heat exchanger is a coolant/air heat exchanger.

16. Apparatus according to claim 1, characterized in that the coolant liquid of the second secondary circuit is a mixture of water and antifreeze.

17. Apparatus according to claim 1, characterized in that the coolant liquid of the first secondary circuit is a mixture of water and antifreeze.

* * * * *

UNITED STATES PATENT AND TRADEMARK OFFICE
CERTIFICATE OF CORRECTION

PATENT NO. : 6,915,649 B2
DATED : July 12, 2005
INVENTOR(S) : Manuel Amaral et al.

It is certified that error appears in the above-identified patent and that said Letters Patent is hereby corrected as shown below:

Title page,
Item [54], Title, should read -- OPTIMISED HEAT PUMP APPARATUS FOR REGULATING MOTOR VEHICLE TEMPERATURE --.
Item [73], Assignee, should read -- Peugeot Citroen Automobiles SA --.

Signed and Sealed this

Thirty-first Day of January, 2006

JON W. DUDAS
*Director of the United States Patent and Trademark Office*